United States Patent
Furuichi et al.

(10) Patent No.: US 9,218,499 B2
(45) Date of Patent: Dec. 22, 2015

(54) DATA DUPLICATION USING A SHARED STORAGE AREA WITH IMPROVED ACCESS CONTROL

(75) Inventors: Sanehiro Furuichi, Kanagawa (JP); Masami Tada, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 600 days.

(21) Appl. No.: 13/335,767

(22) Filed: Dec. 22, 2011

(65) Prior Publication Data

US 2012/0166737 A1    Jun. 28, 2012

(30) Foreign Application Priority Data

Dec. 22, 2010   (JP) ................................ 2010-285708

(51) Int. Cl.
G06F 9/54       (2006.01)
G06F 21/62      (2013.01)

(52) U.S. Cl.
CPC ............ *G06F 21/6209* (2013.01); *G06F 9/543* (2013.01); *G06F 2221/2137* (2013.01); *G06F 2221/2141* (2013.01)

(58) Field of Classification Search
CPC ................. G06F 21/6209; G06F 9/543; G06F 2221/2137; G06F 2221/2141
USPC .................................................. 715/769, 770
See application file for complete search history.

(56) References Cited

U.S. PATENT DOCUMENTS

| | | | |
|---|---|---|---|
| 5,671,277 A | * | 9/1997 | Ikenoue et al. ............... 713/179 |
| 7,484,245 B1 | * | 1/2009 | Friedman et al. ............... 726/27 |
| 7,516,398 B2 | * | 4/2009 | Yang .............................. 715/230 |
| 2007/0011749 A1 | * | 1/2007 | Allison et al. .................. 726/26 |
| 2008/0151288 A1 | * | 6/2008 | Matsunoshita ............... 358/1.15 |
| 2008/0168135 A1 | * | 7/2008 | Redlich et al. ............... 709/204 |
| 2011/0131179 A1 | * | 6/2011 | Ohata et al. .................. 707/609 |

FOREIGN PATENT DOCUMENTS

| | | |
|---|---|---|
| JP | 2000148599 A | 5/2000 |
| JP | 2005250896 A | 9/2005 |
| JP | 2010170165 A | 8/2010 |
| JP | 2010176431 A | 8/2010 |

* cited by examiner

*Primary Examiner* — Gary W Cygiel
(74) *Attorney, Agent, or Firm* — Yee & Associates, P.C.; Jeffrey S. LaBaw

(57) ABSTRACT

An enhanced security protection in data duplication using a shared storage area is provided. Specifically, an information processing apparatus, in which one or more applications operate, includes a copy-operation monitoring portion that acquires copy data that the copy source application issues an instruction to copy to a general-purpose shared memory, sets a lifetime interpreted from an operation pattern via an input device for the copy data, and then stores the copy data in a storage area; a display portion that displays, on a display, a paste candidate selected from one or more items of copy data stored in the storage area; a paste-operation monitoring portion that transfers the paste candidate read from the storage area to the paste destination application in response to a confirmation operation via the input device; and an erasing portion that erases, from the storage area, copy data that has become unpermitted to remain because the lifetime has expired.

16 Claims, 9 Drawing Sheets

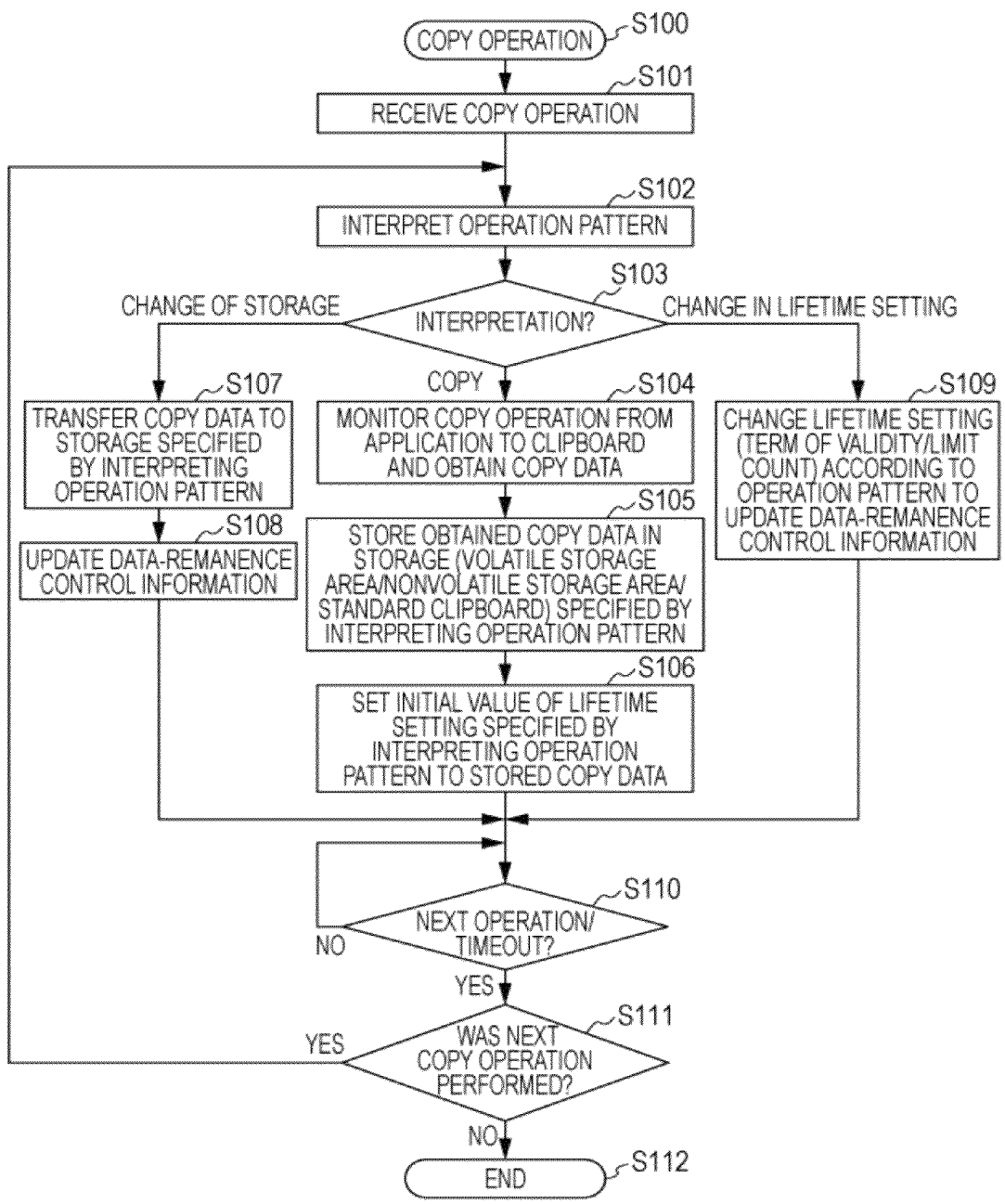

| OPERATION PATTERN | ACTION |
|---|---|
| Ctrl + C (FIRST TIME) | SET LIMIT COUNT 1 AND COPY DATA TO VOLATILE STORAGE AREA |
| Ctrl + C (SECOND TO NINTH TIME) | LIMIT COUNT + 1 |
| Ctrl + C (TENTH TIME) | CHANGE STORAGE FROM VOLATILE STORAGE AREA TO NONVOLATILE STORAGE AREA |

(B)
200B

| OPERATION PATTERN | ACTION |
|---|---|
| Ctrl + C (FIRST TIME) | SET LIMIT COUNT 1 AND COPY DATA TO VOLATILE STORAGE AREA |
| Ctrl + C (PRESS AND HOLD: FIRST TIME) | SET LIMIT COUNT 1 AND COPY DATA TO NONVOLATILE STORAGE AREA |
| Ctrl + C (SECOND OR FURTHER TIME) | LIMIT COUNT + 1 |
| Ctrl + C (PRESS AND HOLD: SECOND OR FURTHER TIME) | CHANGE STORAGE FROM VOLATILE STORAGE AREA TO NONVOLATILE STORAGE AREA |

(C)
200C

| OPERATION PATTERN | ACTION |
|---|---|
| Ctrl + C (FIRST TIME) | SET LIMIT COUNT 10 AND COPY DATA TO NONVOLATILE STORAGE AREA |
| Ctrl + C (SECOND TO FIFTH TIME) | LIMIT COUNT - 1 |
| Ctrl + C (SIXTH TIME) | CHANGE STORAGE FROM NONVOLATILE STORAGE AREA TO VOLATILE STORAGE AREA |
| Ctrl + C (SEVENTH OR FURTHER TIME) | LIMIT COUNT - 1 (MINIMUM VALUE 1) |

| OPERATION PATTERN | ACTION |
|---|---|
| Ctrl + C (FIRST TIME: ORDINARY) | SET LIMIT COUNT 10 AND COPY DATA TO NONVOLATILE STORAGE AREA |
| Ctrl + C (FIRST TIME: SECRET) | SET LIMIT COUNT 1 AND COPY DATA TO VOLATILE STORAGE AREA |
| Ctrl + C (SECOND OR FURTHER TIME: ORDINARY) | LIMIT COUNT + 10 |
| Ctrl + C (SECOND OR FURTHER TIME: SECRET) | LIMIT COUNT + 1 |

(B)
200E

| OPERATION PATTERN | ACTION |
|---|---|
| Ctrl + C (FIRST TIME) | COPY DATA TO CLIPBOARD |
| Ctrl + C (SECOND TIME) | SET LIMIT COUNT 1 AND CHANGE STORAGE FROM CLIPBOARD TO VOLATILE STORAGE AREA |
| Ctrl + C (THIRD TIME) | SET LIMIT COUNT 1 AND CHANGE STORAGE FROM VOLATILE STORAGE AREA TO NONVOLATILE STORAGE AREA |

FIG. 5

| ID NUMBER | STORAGE TYPE | TERM OF VALIDITY | LIMIT COUNT |
|---|---|---|---|
| 1 | STORAGE | — | 10 |
| 2 | MEMORY | — | 3 |
| 3 | MEMORY | 20xx/xx/xx xx:xx | — |
| 4 | STORAGE | 20xx/xx/xx xx:xx | 2 |
| 5 | MEMORY | — | — |
| ⋮ | ⋮ | ⋮ | ⋮ |

146, 146a, 146b, 146c, 146d

LIFETIME SETTING (146c, 146d)

FIG. 8
(A)
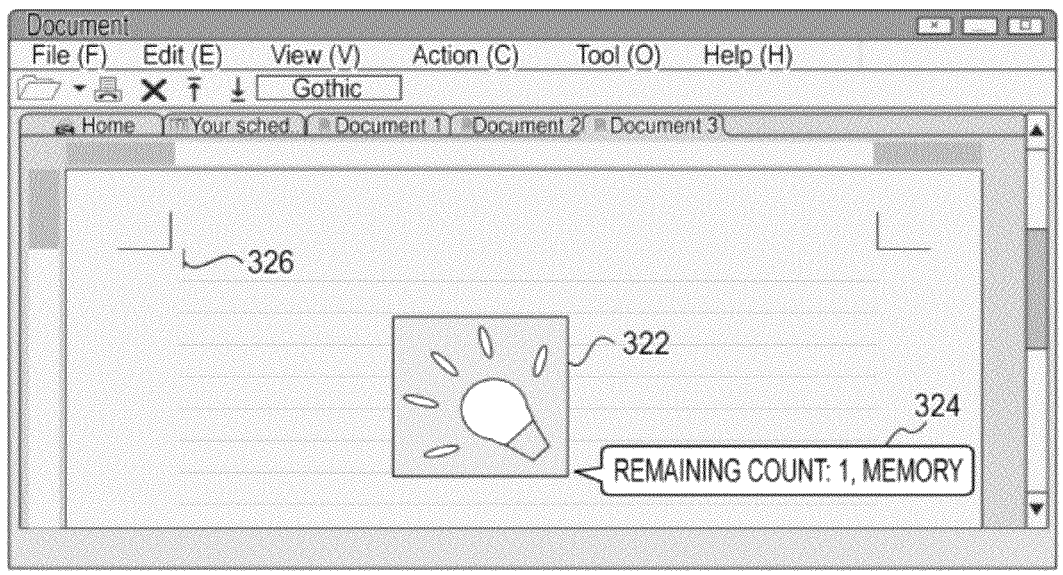
(B)
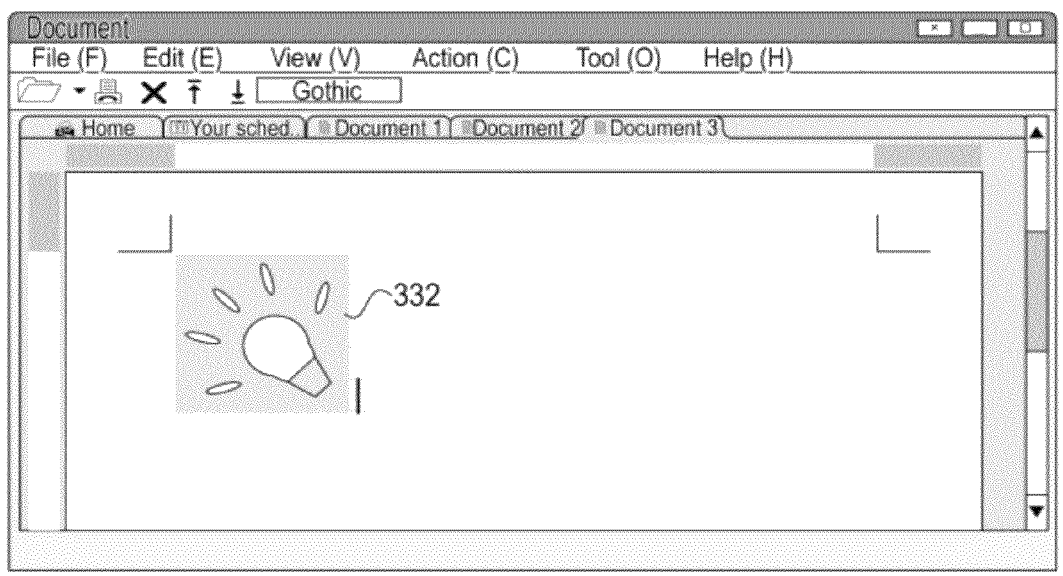

DATA DUPLICATION USING A SHARED STORAGE AREA WITH IMPROVED ACCESS CONTROL

BACKGROUND

1. Field

The present invention relates to data duplication using a shared storage area, and more specifically, to an information processing apparatus, a data duplication method, a program, and a storage medium for improving security level in data duplication using a shared storage area.

2. Description of the Related Art

A desktop environment in a general operating system is equipped with a clipboard for temporarily storing data. The clipboard is a convenient general-purpose shared memory into which data can be freely written from various applications by a simple operation and from which data can be freely read—provided that a format thereof can be interpreted.

In a general clipboard, one item of data can be stored at one time; however, Microsoft Office (a registered trademark), Emacs and so on provide an extended function for storing past data in another area as an extended function specific to their applications. This function facilitates sharing a plurality of items of data among the applications; however, this is an extended function specific to the applications, and the data is stored in a volatile storage area, which requires that the applications are in operation, and on completion of the applications, the data is lost.

From the viewpoint of extending the function of the clipboard, Japanese Unexamined Patent Application Publication No. 2010-170165 (Patent Literature 1) discloses a data duplication method including saving means capable of ordinary data storage and storing copy source data for pasting; loading means capable of ordinary data reading and restoring copy source data for pasting on an object basis from a copy and paste specific file; copying means for specifying copy source data and creating a paste data file using the saving means; and pasting means for producing a duplicate of the copy source necessary for pasting using the loading means. The technology of Patent Literature 1 allows data to be shared by a plurality of users and to be reused after restarting the computer.

Also in the viewpoint of extending the function of the clipboard, Japanese Unexamined Patent Application Publication No. 2005-250896 (Patent Literature 2) discloses a data-entry support apparatus equipped with a copy (or cut) and paste function in which data that is frequently pasted is left in the clipboard as much as possible.

As described above, the clipboard is a convenient function; however, in the viewpoint of security, it is difficult to manage because of the convenience, which can cause a serious security incident. Unlike a kernel object, the clipboard is a user object that is not equipped with an access control mechanism, such as an access control list (ACL). Therefore, there is a risk of unintended information leakage to a suspicious program operating on the same desktop environment. Although data on a clipboard, pasted on a necessary location, is normally unnecessary data, important data is sometimes left without being overwritten. At that time, the data left on the clipboard may leak to the outside via a peer-to-peer pear file-swapping application or the like infected with a virus. Such information leakage is not permitted in organizations, such as government and municipal offices, universities, and companies.

Accordingly, this intensifies the need for some security restrictions on the clipboard function to prevent information leakage. As a measure against information leakage via a shared memory, for example, Japanese Unexamined Patent Application Publication No. 2010-176431 (Patent Literature 3) discloses an access control program, for the purpose of preventing information leakage caused by reuse of information by a user having an access right, in which particular processes, such as copying and pasting, that an OS or applications perform to reuse the content of a protected document stored in a document storage area, are monitored, and when the particular processes are detected, various processes for setting a second access right, which succeeds a first right, to a second document that reuses the content of a first document, to which a first right is set, are executed.

According to the related art of Patent Literature 3, the access control policy of a copy source document is handed over to a copy destination document, so that an information flow via the shared memory can be controlled. However, the technology of Patent Literature 3 is a technology for setting a document access control policy, and thus, data may remain in an unprotected state on the shared memory.

The foregoing background requires a technology capable of efficiently limiting the lifetime of data in a shared storage area, such as a clipboard, so that unnecessary data after being pasted to a necessary location can be efficiently erased.

On the other hand, since the clipboard is a general-purpose shared memory that is accessed from all processes, uniformly limiting the function of the clipboard results in a loss of the convenience. For GUI-based computers, it is not desirable to unnecessarily impair the user convenience for the purpose of enhancing the security. Furthermore, because only protection for particular applications has low effect, it is desirable to achieve a high-versatility application-independent function. Furthermore, since there are various levels of secrecy required for information, it is desirable to protect data in a shared storage area at various levels.

CITATION LIST

Patent Literature

[PTL 1] Japanese Unexamined Patent Application. Publication No. 2010-170165
[PTL 2] Japanese Unexamined Patent Application. Publication No. 2005-250896
[PTL 3] Japanese Unexamined Patent Application. Publication No. 2010-176431

Non Patent Literature

[NPL 1] Sanehiro FURUICHI, and Michiharu KUDO, "Access Control Policy Management for GUI-based Computer", Information Processing Society of Japan, IPSJ Journal, Vol. 49, No. 9, pp. 1-11 (September, 2008).

SUMMARY

Technical Problem

The present invention has been made in consideration of the problems of the related arts, and an object thereof is to provide an information processing apparatus, a data duplication method, a program, and a storage medium capable of efficiently limiting the lifetime of data in a shared storage area, typified by a clipboard, without reducing the ease of operation of users and the convenience of the shared storage area, so that both the convenience and security protection of the shared storage area can be achieved.

Solution to Problem

The present invention has been made in consideration of the problems of the related art. Accordingly, the present invention provides an information processing apparatus having the following characteristics. An information processing apparatus of the present invention in which one or more applications operate includes a copy-operation monitoring portion that acquires copy data that a copy source application issues an instruction to copy to a general-purpose shared memory, sets a lifetime interpreted from an operation pattern via an input device for the copy data, and then stores the copy data in a nonvolatile or volatile storage area.

The information processing apparatus further includes a display portion that displays, on a display, a paste candidate selected from one or more items of copy data stored in the storage area; a paste-operation monitoring portion that transfers the paste candidate read from the storage area to a paste destination application in response to a confirmation operation via the input device; and an erasing portion that erases, from the storage area, copy data that has become unpermitted to remain because the lifetime has expired. According to an aspect, the copying can include cutting that involves erasing a copy content from a copy source application. Furthermore, the present invention allows one of the volatile storage area and the nonvolatile storage area to be specified as a designated storage by interpreting the operation pattern via the input device.

Advantageous Effects of Invention

The above configuration allows a lifetime to be freely set for copy data stored in a shared storage area using an operation pattern via an input device. Copy data whose lifetime has expired is erased in sequence from the storage area by the data erasing portion. Accordingly, this can suitably reduce the possibility that copy data remains unintentionally in the storage area to cause information leakage. Thus, the lifetime of data in the shared storage area can be efficiently limited to enhance the security without reducing the ease of operation of users and the convenience of the shared storage area.

BRIEF DESCRIPTION OF THE SEVERAL VIEWS OF THE DRAWINGS

FIG. 2 is a flowchart of a copy process to an extended clipboard that a copy-operation monitoring portion of a computer according to the embodiment of the present invention executes.

FIG. 3 is of diagrams showing examples of the data structures of interpretation rules that can be referred to when interpreting an operation pattern.

FIG. 4 is of diagrams showing examples of the data structures of interpretation rules that can be referred to when interpreting an operation pattern.

FIG. 5 is a diagram showing an example of the data structure of data-remanence control information managed in an extended clipboard of this embodiment.

FIG. 8 is of diagrams showing examples of a paste destination application window displayed on the display screen of the computer of this embodiment.

DETAILED DESCRIPTION

Although the present invention will be described hereinbelow with embodiments, the present invention is not limited to the embodiments described below.

Figure 1:
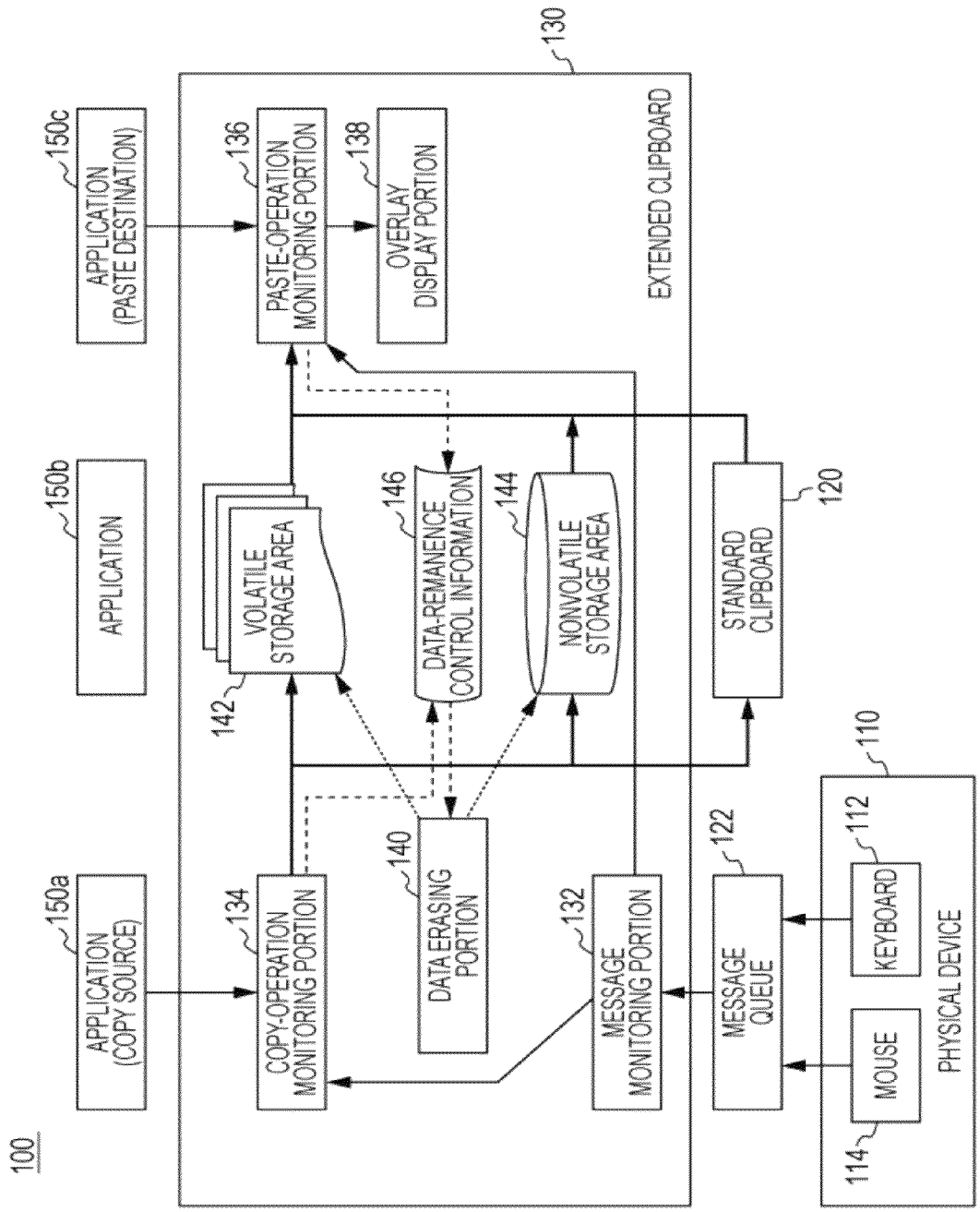
FIG. 1 is a functional block diagram of an information processing apparatus according to an embodiment of the present invention.

An information processing apparatus according to embodiments of the present invention will be described with reference to FIGS. 1 to 9. FIG. 1 is a functional block diagram of an information processing apparatus according to an embodiment of the present invention. The information processing apparatus shown in FIG. 1 is, not particularly limited, configured as a computer 100, such as desktop, notebook, tablet, and netbook personal computers, a workstation, a server, a portable terminal, and a personal digital assistant (PDA).

The computer 100 includes a central processing unit (CPU), a random access memory (RAM), a hard disk drive (HDD) or a solid state drive (SSD), and a network interface card (NIC) (not shown). The computer 100 of this embodiment further includes an input device, such as a keyboard 112 and a mouse 114, or a touch panel (not shown), as a physical device 110 for providing a user interface, and a display unit, such as a display (not shown). The computer 100 operates under the control of a graphical user interface (GUI) based operating system (hereinafter, referred to as an OS), such as Windows (a registered trademark), Linux (a registered trademark), UNIX (a registered trademark), and Mac (a registered trademark) OS X.

The computer 100 includes one or more applications 150a to 150c operating on an OS. Examples of the applications 150a to 150c are, not particularly limited, a web browser, a mailer, a document preparation application, groupware, a spreadsheet application, a database application, a presentation application, and an integrated development environment.

The computer 100 can include a standard clipboard 120, that is, a so-called general-purpose shared memory, as part of functions that the OS provides. The standard clipboard 120 allows the user to write data freely from various applications 150 by menu selection or a simple operation using a shortcut key and to read data to various applications by a similar simple operation.

The computer 100 further includes a message queue 122, as part of functions that the OS provides, on which messages corresponding to the operations of the physical device 110, such as the keyboard 112 and the mouse 114, are posted. When an operation is performed on the keyboard 112 or the mouse 114, the OS posts a message corresponding to the operation on the message queue 122. Thereafter, the message is generally extracted from the message queue 122 in a thread message loop and is transferred again to corresponding one of applications 150 via the system.

The standard clipboard 120 mentioned above is a user object, which can be accessed from all applications and has no access limit mechanism. Thus, there is a risk of information leakage via the standard clipboard 120. Therefore, the computer 100 according to the embodiment of the present invention includes an extended clipboard 130 in addition to, or instead of, the standard clipboard 120.

The extended clipboard 130 monitors an application programming interface (hereinafter referred to as an API) and the message queue 122 and controls accesses from the process to resources, such as the standard clipboard 120, in accordance with the result of monitoring the transfer of a message from the physical device 110 to the process. The extended clipboard 130 can be configured as a library that is incorporated into the individual applications 150 operating on the computer 100 and that operates between the applications 150 and the OS to provide an extended shared storage area. Such a library is referred to as a dynamic link library or a shared library.

A copy operation using the extended clipboard 130 will be described hereinbelow. More specifically, the extended clipboard 130 includes a message monitoring portion 132 and a copy-operation monitoring portion 134. The message monitoring portion 132 monitors the message queue 122 and obtains messages related to the operations of the physical device 110 on the windows of the application 150a to 150c posted to the message queue 122. If the obtained message is a message on a copy operation, the message monitoring portion 132 transfers the message to the copy-operation monitoring portion 134.

The copy-operation monitoring portion 134 interprets the message transferred from the message monitoring portion 132 and processes it and monitors an API related to copying (hereinafter referred to as a copy API). When the application 150a serving as a copy source performs an API call to instructs the standard clipboard 120 to perform copying, the copy-operation monitoring portion 134 obtains the copy data, sets a lifetime that defines a range in which the data is permitted to remain, and stores the data in a predetermined storage.

The storage of the copy data includes a volatile storage area 142 that a volatile storage unit, such as a RAM, provides and a nonvolatile storage area 144 that a nonvolatile storage unit, such as a HDD and an SSD, provides. This embodiment is provided with the nonvolatile storage area 144, in which copy data is stored, so that the user can use the copy data even after the computer 100 is once shutdown. The volatile storage area 142 and the nonvolatile storage area 144 are configured to each store one or a plurality of items of copy data so that data that was copied in the past can also be reused for a long period of time.

On the other hand, lifetimes can be set to copy data stored in the volatile storage area 142 and the nonvolatile storage area 144. Examples of the lifetimes to be set are, not particularly limited, the term of validity that defines a term in which data is permitted to remain and a limit count (or frequency) that defines the limit of the number of pasting times permitted for the data.

The settings of the storage and lifetime of copy data are managed using, for example, data-remanence control information 146 having a data structure as shown in FIG. 5, to be described later in detail. In the case where the volatile storage area 142 or the nonvolatile storage area 144 is used as the storage, the above API call from the copy source application 150a is blocked so that the copy data is not transferred to the standard clipboard 120.

In the embodiment of the present invention, the operation patterns of the keyboard 112 and the mouse 114 are given meaning. The copy-operation monitoring portion 134 receives a message on a copy operation and interprets the operation pattern to thereby determine the storage of the copy data and a lifetime set for the copy data. The operation pattern is described as an operation state or the time series of operation states of the keyboard 112 and the mouse 114 or one of them, such as a key combination in a keyboard operation, the sequence of a key combination, and a mouse gesture.

A configuration example in a Windows (a registered trademark) environment will be described. The copy operation can be configured such that copy data is stored in the volatile storage area 142 using the first key combination, "Ctrl+C" with a limit count of 1, and the limit count is increased using the following key combinations, "Ctrl+C". In another configuration example, the volatile storage area 142 is selected by pressing the key combination, "Ctrl+C", once, and the nonvolatile storage area 144 is selected by pressing and holding the key combination, "Ctrl+C".

While the copy operation has been described, a cut operation is the same as the copy operation in that data is written to the extended clipboard 130, as viewed from the extended clipboard 130, although it differs in that the cut content is erased, as viewed from the application side. Accordingly, this embodiment describes the cut operation as one aspect of the copy operation.

FIG. 1 shows a route for copying data that does not need to be secret, such as known information, to the standard clipboard 120, in addition to the volatile storage area 142 and the nonvolatile storage area 144. However, the route to the standard clipboard 120 can be blocked in viewpoint of improving the security of commercial computers and so on that handle secret information.

A paste operation using the extended clipboard 130 will be described hereinbelow. The extended clipboard 130 further includes a paste-operation monitoring portion 136 and an overlay display portion 138. If an obtained message is a message on a paste operation, the message monitoring portion 132 transfers the message to the paste-operation monitoring portion 136. The paste-operation monitoring portion 136 interprets the message transferred from the message monitoring portion 132 and processes it, and monitors an API related to pasting (hereinafter referred to as a paste API).

More specifically, the paste-operation monitoring portion 136 receives the message on the paste operation and interprets the operation pattern, as in the copy operation to select copy data to be pasted and confirm it. The overlay display portion 138 draws the selected paste candidate, on a display screen, of one or more items of copy data stored in the storage area. A method for drawing is not particularly limited; however, this embodiment creates a transparent window in front of the window of the paste destination application 150c, on which the paste candidate is overlaid.

An example in a Windows (a registered trademark) environment will be described. The paste operation can be configured such that a paste candidate is selected with a key combination, "Ctrl+V", in a predetermined order, such as a reverse chronological order (or a chronological order), while the "Ctrl" key is held, and the key is released while the desired copy data is selected and displayed, so that the data to be pasted can be confirmed.

When the application 150c, which is a paste destination, performs an API call that issues an instruction to paste copy data from the standard clipboard 120, the paste-operation monitoring portion 136 transfers the confirmed copy data to be pasted to the paste destination application 150c. In the case where the copy data confirmed as data to be pasted is subjected to lifetime setting, such as a limit count, that needs to be rewritten according to the paste operation, the paste-operation monitoring portion 136 updates the data-remanence control information 146, such as decreasing the limit count.

The paste destination application 150c obtains the transferred copy data and pastes the copy data in an appropriate format. Although the paste destination application 150c in FIG. 1 differs from the copy source application 150a, the copy source and the paste destination may be the same application.

Handling of copy data whose lifetime has expired in the copy (cut) and paste operation using the extended clipboard 130 will be described. The extended clipboard 130 further includes a data erasing portion 140. The data erasing portion 140 determine whether data whose lifetime has expired so that it becomes unpermitted to remain, with reference to the data-remanence control information 146 regularly or irregularly or in response to an explicit notification that the lifetime of the copy data has expired from the paste-operation monitoring portion 136.

When data whose lifetime has expired so that it becomes unpermitted to remain is found, the data erasing portion 140 erases the corresponding copy data from the volatile storage area 142 or the nonvolatile storage area 144 and also the registration thereof from the data-remanence control information 146. In an embodiment in which only lifetime setting, such as the limit count, is provided which needs rewriting according to the paste operation, the function of the data erasing portion 140 may be included in the function of the paste-operation monitoring portion 136.

The flow of the process of the copy operation will be described in more detail with reference to FIG. 2. FIG. 2 is a flowchart of the copy process to the extended clipboard 130 that the copy-operation monitoring portion 134 of the computer 100 according to the embodiment of the present invention executes. The process shown in FIG. 2 is started from step S100, and in step S101, the copy-operation monitoring portion 134 obtains a message on a copy operation from the message monitoring portion 132. In step S102, the copy-operation monitoring portion 134 interprets the operation pattern. The interpretation of the operation pattern can be performed by application of any of interpretation rules 200 shown in FIGS. 3(A) to 3(C) and FIGS. 4(A) and 4(B), for example; however it is not particularly limited thereto.

FIGS. 3 and 4 show examples of the data structure of interpretation rules 200 that can be referred to when the operation pattern is interpreted. The examples shown in FIGS. 3 and 4 are for a shortcut key, "Ctrl+C", (hereinafter referred to as a copy key operation), which is general in Windows (a registered trademark), in which the operation pattern is defined by the number of continuous pressing of the shortcut key and whether it is pressed for a long time or a short time. For example, an interpretation rule 200A in the example in FIG. 3(A) defines an action to set the paste limit count to one and store copy data in the volatile storage area 142 in the first copy key operation, an action to increase the limit count by one in the second and further copy key operations, and an action to change the storage from the volatile storage area 142 to the nonvolatile storage area 144 in the tenth copy operation.

An interpretation rule 200B shown in FIG. 3(B) defines an action to select the volatile storage area 142 by pushing the key once, select the nonvolatile storage area 144 by pushing and holding the key, and set the paste limit count to one, and store the copy data in the first copy key operation. In the second and further copy operations, the limit count is increased by one by a short-pushing copy key operation, and the storage is changed to the nonvolatile storage area 144 by a push and hold copy key operation.

For changing the lifetime, as FIGS. 3(A) and 3(B), rules can be created so that the limit count is increased, or the storage is changed from the volatile storage area 142 to the nonvolatile storage area 144 in which data can be stored for a longer period of time, that is, the security is decreased while the convenience is increased, with an increasing number of copy key operations; however, it is not particularly limited thereto. As shown in FIG. 3(C), the rule may be created so that the copy data is first stored in the nonvolatile storage area 144, with a large limit count, and the limit count is decreased, and the storage is changed from the nonvolatile storage area 144, in which copy data can be stored for a long period of time, to the short-term volatile storage area 142 with an increasing number of copy key operations, that is, the security is increased as the convenience is decreased.

Furthermore, as shown in FIG. 4(A), an increase in limit count for each copy key operation may be changed between a case in which ordinary-level security is required and a case in which a secret level is required depending on the attribute of a document focused in the copy source application 150a. For the details of dynamic access control depending on the security level of a document opened in an application, refer to Non Patent Literature 1 (Sanehiro FURUICHI, and Michiharu KUDO, "Access Control Policy Management for GUI-based Computer", Information Processing Society of Japan, IPSJ Journal, Vol. 49, No. 9, pp. 1-11 (September, 2008)).

In another embodiment, the lifetime can be automatically determined in accordance with a security level determined from the content of copy data in cooperation with a content analysis engine that executes content analysis adopted in a known data loss protection (DLP) technology. For example, for copy data with high degree of secrecy, shorter lifetime or less limit count can be determined. In this case, the user can increase and decrease the automatically determined lifetime within a fixed limit range (for example, an upper limit) using the operation pattern.

The content analysis engine is an engine which can be implemented as a module inside or outside the computer 100 and which analyzes the content to determine whether secret information is included. For example, the engine can create an index from database in which secret information, such as customer information, is stored and can detect secret information registered in the database using the index. Alternatively, the engine can register a secret document file to create an index and can detect a copy of the registered document or a document created by quoting part of the document using the index. Furthermore, the engine can specify secret information using a specific keyword or phrase included in the document or using the attributes of the file.

In addition, as shown in FIG. 4(B), the rule may be created so that the storage is changed from one copy key operation to another. In the example shown in FIG. 4(B), the storage is changed for each copy key operation, that is, first, to the clipboard 120, next, to the volatile storage area 142 in which the data remains until the power of the computer 100 is shut off, and finally, to the nonvolatile storage area 144 in which data remains even if the power of the computer 100 is shut off.

Referring again to FIG. 2, in step S103, the process is separated depending on the interpretation of the operation pattern in step S102. In step S103, if it is interpreted that a copy process is required (copy), the process moves to step S104. If it is interpreted in step S103 that a change of storage is required (change of storage), the process moves to step S107. If it is interpreted in step S103 that a change of lifetime setting is required (change of lifetime setting), the process moves to step S109.

If a copy process is required, the copy source application 150a received the message and issues a copy API call that issues an instruction to copy data to the standard clipboard 120. In this case, in step S104, the copy-operation monitoring portion 134 detects the copy API call from the copy source application 150a and obtains copy data from the application 150a.

In step S105, the copy-operation monitoring portion 134 stores the obtained copy data in a storage specified from the interpretation in step S102 (one of the volatile storage area 142, the nonvolatile storage area 144, and the standard clipboard 120). In step S106, the copy-operation monitoring portion 134 adds a record corresponding to the stored copy data to the data-remanence control information 146 and sets an initial value for lifetime setting specified by the interpretation of the operation pattern to the stored copy data, and the process moves to step S110. For example, if the interpretation rule shown in FIG. 3(A) is applied, it is interpreted that a copy process is required in the first copy key operation, and in step S105, the copy data is stored in the volatile storage area 142, and in step S106, limit count 1 is set.

FIG. 5 shows an example of the data structure of the data-remanence control information 146 managed on the extended clipboard 130 of this embodiment. As shown in FIG. 5, the data-remanence control information 146 includes an identification number field 146a that identifies copy data, a storage type field 146b that manages the type of storage, a term-of-validity field 146c that manages the term of validity, and a limit count field 146d that manages the limit of the number of pasting times.

The example shown in FIG. 5 has both of the term-of-validity field and the limit count field as lifetime settings for copy data. In the case where both the term of validity and the limit count are set, the lifetime is expired when the term of validity is reached or the limit count of pasting is performed. In the data-remanence control information 146 shown in FIG. 5, copy data is listed in a reverse chronological order (or a chronological order), with the latest copy data placed at the head (or the end) and is used also as history data.

As shown in FIGS. 1 and 5, in the embodiment described, the lifetime set for copy data is managed by a table separate from the copy data; however, it is not particularly limited thereto. In another embodiment, the lifetime may be managed in each of the volatile storage area 142 and the nonvolatile storage area 144 in the form of attachment to copy data.

Referring again to FIG. 2, in step S110, the next message from the message monitoring portion 132 is waited for, in which the process loops step S110 until the next new message is obtained, or a predetermined time passes to time-out (during NO period). In step S110, if the next operation message is obtained or a time-out occurs, the process moves to step S111. In step S111, the copy-operation monitoring portion 134 determined whether the following copy operation has been performed. For example, if an event irrelevant to copying is performed or a time-out occurs, it is determined that no following copy operation has been performed.

In step S111, if the following copy operation has not been performed (NO), the copy process is finished in step S112. On the other hand, for example, if it is determined in step S111 that the following copy key operation has been performed, and the following copy operation for the copy process has been performed (YES), the process is looped to step S102, where interpretation on the following copy operation is performed.

Referring again to step S103, if it is interpreted that a change of storage is required (change of storage), in step S107, the copy-operation monitoring portion 134 transfers the copy data from the present storage to a storage specified by interpreting the operation pattern, and in step S108, updates the data-remanence control information along with the change of storage. For example, if the interpretation rule shown in FIG. 3(A) is applied, it is interpreted that a change to the nonvolatile storage area 144 is required at the tenth operation after continuous copy operations. In this case, in step S107, the copy data in the volatile storage area 142 is moved to the nonvolatile storage area 144, and in step S108, the storage type in the data-remanence control information 146 is changed to "storage". If a change of storage is required, the copy API called as a result of transmission of the message to the copy source application 150a by the copy key operation is blocked.

In step S103, if it is interpreted that a change in lifetime setting is required (change in lifetime setting), in step S109, the lifetime setting is changed according to the interpretation of the operation pattern to update the data-remanence control information 146. For example, if the interpretation rule shown in FIG. 3(A) is applied, in step S109, the limit of number of pasting times is increased by a predetermined number for the individual second to ninth continuous copy key operations. In the case where the term of validity is set, the term of validity can be extended stepwisely for each of the second to ninth copy key operations in step S109. If a change of lifetime setting is required, the copy API called as a result of transmission of the message to the copy source application 150a by the copy key operation is blocked.

Figure 6:
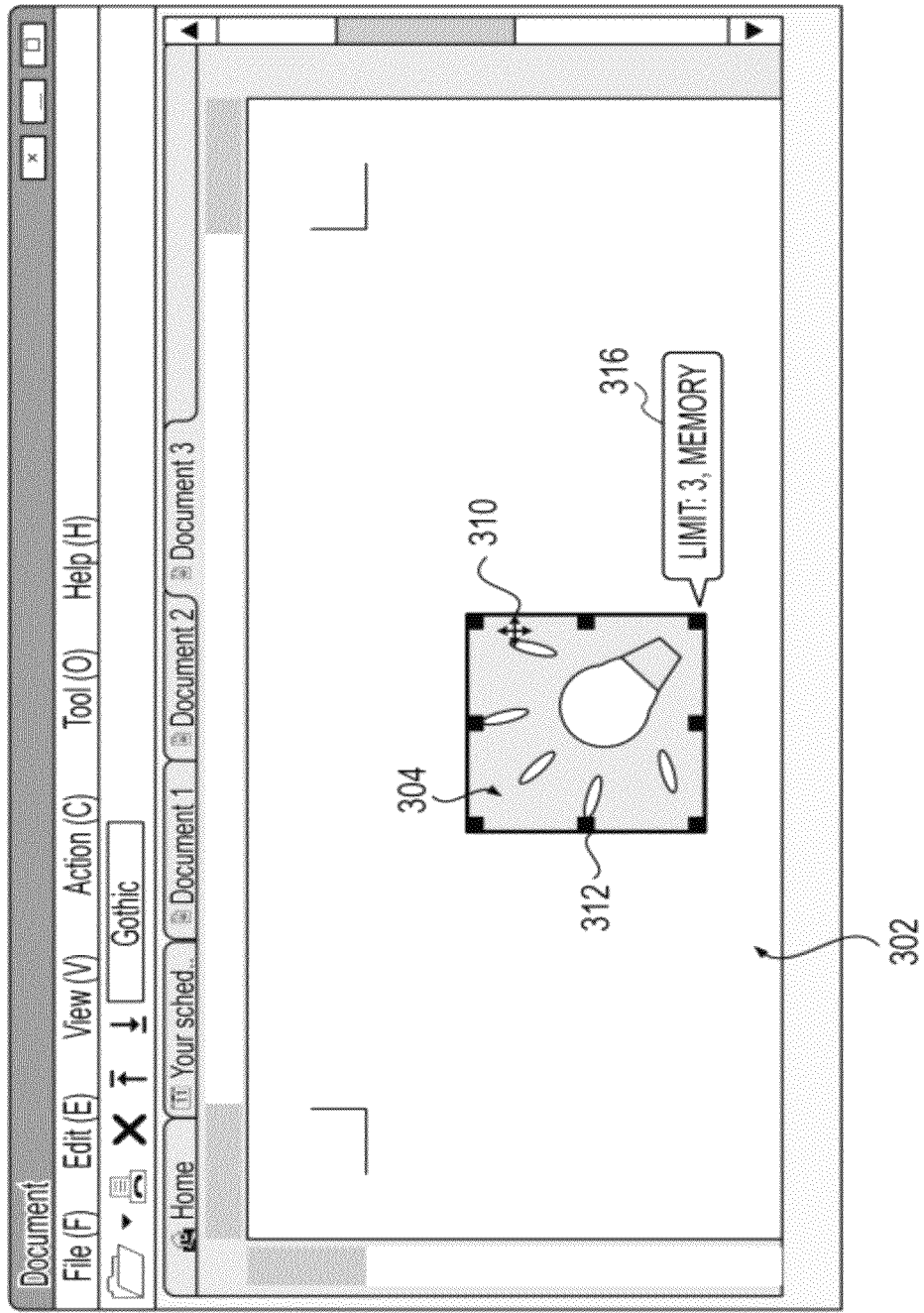
FIG. 6 shows an example of a copy source application window displayed on the display screen of the computer of this embodiment.

FIG. 6 shows an example of a copy source application window displayed on the display screen of the computer 100 of this embodiment. A window 300 shown in FIG. 6 is such that an image object 304 is displayed in an editor area 302 that displays the content of a document so that it can be edited, in which the image object 304, enhanced by a frame 312, is selected by a mouse pointer 310. For example, when the first copy key operation is performed, with the first image object 304 selected, the image object 304 is copied to the extended clipboard 130. When the subsequent copy key operation is performed, the limit count increases, as shown in FIG. 6, in which a pop-up window 316 in which the limit of the number of pasting times and the storage are shown is displayed. Thereafter, when an operation irrelevant to the copy operation, such as clicking on another area, is performed, this copy process including lifetime setting is finished.

Figure 7:
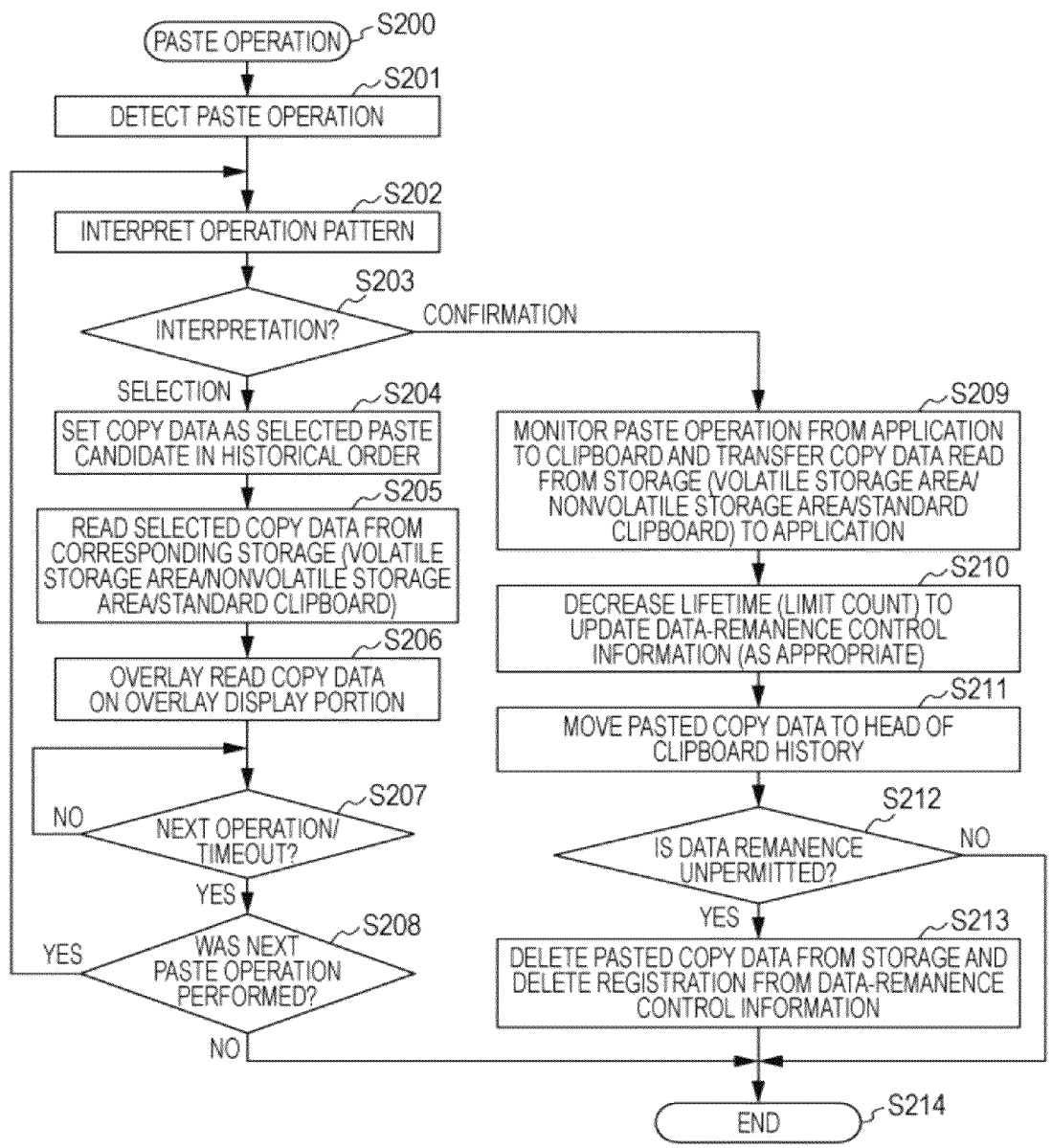
FIG. 7 is a flowchart showing a paste process from the extended clipboard executed by a paste-operation monitoring portion of the computer according to the embodiment of the present invention.

The flow of the process of the paste operation will be described in more detail with reference to FIG. 7. FIG. 7 is a flowchart showing a paste process from the extended clipboard 130 executed by the paste-operation monitoring portion 136 of the computer 100 according to the embodiment of the present invention. The process shown in FIG. 7 is started from step S200, and in step S201, the paste-operation monitoring portion 136 obtains a message on a paste operation from the message monitoring portion 132. In step S202, the paste-operation monitoring portion 136 interprets the operation pattern. The interpretation of the operation pattern can be performed by applying the same interpretation rules shown in FIG. 3 and FIG. 4; however, it is not particularly limited thereto.

The embodiment described uses a shortcut key "Ctrl+V" (hereinafter referred to as a paste key operation), which is general in Windows (a registered trademark), in which the paste key operation is continued while the "Ctrl" key is held, so that a paste candidate is selected from one or more items of copy data stored in the volatile storage area 142 and the nonvolatile storage area 144, and the paste key operation is cancelled, with the desired copy data being selected, so that the data to be pasted is confirmed.

In step S203, the process is separated in accordance with the interpretation of the operation pattern in step S202. In step S203, if it is interpreted that the operation pattern is a selection operation (selection), the process moves to step S204. In step S203, if it is interpreted that the operation pattern is a confirmation operation (confirmation), the process moves to step S209.

In the case of the selection operation, the paste API called as a result of transmission of the message to the paste destination application 150c by the paste key operation is blocked. In this case, in step S204, the paste-operation monitoring portion 136 sets copy data copied to the extended clipboard 130, as a selected paste candidate, in a reverse chronological order with reference to the data-remanence control information 146 used as history data. In step S205, the paste-operation monitoring portion 136 reads the copy data of the paste candidate from corresponding one of the volatile storage area 142, the nonvolatile storage area 144, and the standard clipboard 120.

Figure 9:
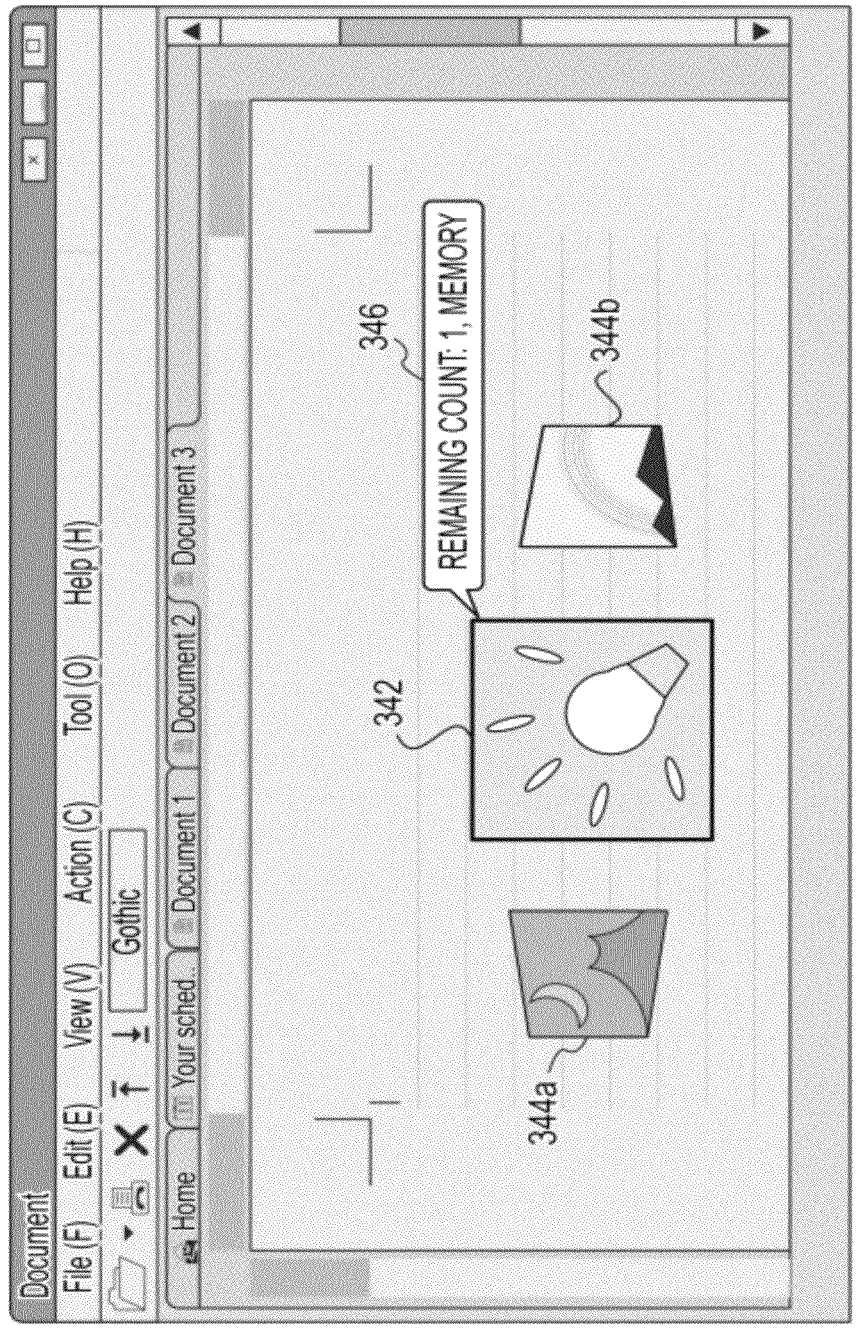
FIG. 9 is a diagram showing another example of the paste destination application window displayed on the display screen of the computer of this embodiment.

In step S206, the paste-operation monitoring portion 136 transfers the read copy data to the overlay display portion 138 and overlays a preview in the case of pasting the copy data. FIG. 8 shows examples of a paste destination application window displayed on the display screen of the computer 100 of this embodiment. As shown in FIG. 8(A), when a paste key operation is performed at a cursor position 326 in the editor window, the data of a selected paste candidate 322 of one or more items of copy data stored in both the volatile storage area 142 and the nonvolatile storage area 144 is overlaid to present the selected content to the user. In the example shown in FIG. 8(A), the storage and the remaining limit count are displayed on a pop-up window 324. The overlay display portion 138 can overlay copy data 344a and 344b other than a selected paste candidate 342, as shown in FIG. 9, so that target copy data can easily be found.

Referring again to FIG. 7, when the process of step S206 is finished, the process moves to step S207. In step S207, the paste-operation monitoring portion 136 waits for the next operation message and loops step S207 until a new message is given or a timeout occurs after a lapse of a predetermined time (during NO period). In step S207, if the next operation message is obtained, the process moves to step S208. In step S208, the paste-operation monitoring portion 136 determines whether the following copy operation has been performed. For example, when a key for stopping the process, such as an escape key, is pressed or an operation irrelevant to the paste operation is performed, the paste-operation monitoring portion 136 determines that the continuance of the paste operation has not been performed.

If it is determined in step S208 that the following copy operation has not been performed (NO), the process branches to step S214, where the paste process is finished. On the other hand, if it is determined in step S208 that the paste key operation has been performed continuously, all the keys have been released, or the following copy operation has been performed (YES), the process is looped to step S202, where interpretation of the following copy operation is performed.

If the operation pattern is a confirmation operation, a message on a paste key operation is issued, and the paste destination application 150c receives the message and issues a copy API call that gives an instruction to perform pasting from the standard clipboard 120. If the operation pattern is interpreted as confirmation in step S203 (confirmation), the process moves to step S209. In step S209, the paste-operation monitoring portion 136 detects the copy API call from the paste destination application 150c and, in response to it, transfers copy data read from corresponding one of the volatile storage area 142, the volatile storage area 144 and the standard clipboard 120 to the paste destination application 150c.

FIG. 8(B) shows an example of a paste destination application window after selected copy data is pasted. As shown in FIG. 8(B), when a paste key is released to perform a confirmation operation, an object 332 is inserted into the cursor position 326 of the editor window.

In step S210, if the copy data is subjected to lifetime setting, such as limit count setting, which needs rewriting in accordance with the paste operation, the paste-operation monitoring portion 136 decreases the lifetime to update the data-remanence control information 146. In step S211, the pasted copy data is moved to the head (or the tail end) and is handled as the latest (or the oldest) data of the history. In step S212, the paste-operation monitoring portion 136 determines whether the remanence of data has become unpermitted as a result of decreasing the lifetime. If it is determined in step S212 that the data remanence has become unpermitted (YES), the process moves to step S213. In step S213, the paste-operation monitoring portion 136 notifies the data erasing portion 140 of the fact to delete the copy data pasting of which has completed from the storage, deletes the registration thereof from the data-remanence control information 146, and terminates the pasting process in step S214.

According to the embodiments, a lifetime can freely set for copy data stored in the extended clipboard 130 by a simple operation. Copy data whose lifetime has expired is erased from the storage area in sequence by the data erasing portion 140. Accordingly, this can suitably reduce the possibility that copy data remains unintentionally in the extended clipboard 130 to cause information leakage.

Furthermore, according to the embodiments, the nonvolatile storage area 144 is provided in addition to the volatile storage area 142, so that one or a plurality of items of copy data can be stored in these shared storage areas. The stored copy data can be pasted to an application by a simple select operation. The storage of the copy data can be designated by a simple operation between the nonvolatile storage area 144 and the volatile storage area 142; for example, low-secrecy data can be used after the computer 100 is restarted by being stored in the nonvolatile storage area 144. In other words, the extended clipboard 130 according to the embodiments effectively limits the number of remaining data to allow a plurality of data items to be easily shared while improving the security, thus suitably enhancing the convenience of the clipboard.

Furthermore, a clipboard function extended in an application-independent form can be provided by being configured, not as an application specific function, but as a shared library incorporated into an application process. Since the shared library is configured to allow a copy API and a paste API to be monitored to control the flow of copy data, copying of data to the standard clipboard 120 can be blocked, and thus, information leakage via the existing standard clipboard 120 can also be suitably prevented.

As described above, according to the embodiments of the present invention, an information processing apparatus, a data duplication method, a program, and a storage medium capable of efficiently limiting the lifetime of data in a shared storage area, typified by a clipboard, can be provided without reducing the ease of operation of users and the convenience of the shared storage area, so that both the convenience and security protection of the shared storage area can be achieved.

The above functions of the present invention can be achieved by computer executable programs described in object oriented programming languages, such as C++, Java (a registered trademark), Java (a registered trademark) Beans, Java (a registered trademark) Applet, Java (a registered trademark) Script, Perl, and Ruby, and can be delivered in a computer readable storage medium or through transmission.

While the present invention has been described in the specific embodiments, it is to be understood that the present invention is not limited to the embodiments, and modifications may be made without departing from the scope that those skilled in the art can consider, such as other embodiments, addition, changes, and deletion, any of which is included in the scope of the present invention provided that the operational advantages of the present invention are offered.

REFERENCE SIGNS LIST

100: computer
110: physical device
112: keyboard
114: mouse
120: standard clipboard
122: message queue
130: extended clipboard
132: message monitoring portion
134: copy-operation monitoring portion
136: paste-operation monitoring portion
138: overlay display portion
140: data erasing portion
142: volatile storage area
144: nonvolatile storage area
146: data-remanence control information
150: application
200: interpretation rule
300, 320, 330, 340: application window
302: editor area
304, 332: image object
310: mouse pointer
312: frame
316, 324, 346: pop-up window
322, 342: paste candidate
326: cursor
344: another copy data

What is claimed is:

1. An information processing apparatus in which one or more applications operate, the apparatus comprising:
a copy-operation monitoring portion that acquires copy data that a copy source application issues an instruction to copy from a document to a general-purpose shared memory, sets a lifetime interpreted from an operation pattern via an input device for the copy data, and then stores the copy data in a storage area;
a display portion that displays, on a display, a paste candidate selected from one or more items of copy data stored in the storage area;
a paste-operation monitoring portion that transfers the paste candidate read from the storage area to a paste destination application in response to a confirmation operation via the input device; and
an erasing portion that erases, from the storage area, copy data whose lifetime has expired, wherein the copy-operation monitoring portion determines the lifetime, in cooperation with a content analysis engine that analyzes the content of the obtained copy data, depending on a security level of the copy data that is determined by the content analysis performed by the content analysis engine using a specific keyword or phrase included in the document to determine the security level of the copy data.

2. The information processing apparatus according to claim 1, wherein the storage area in which the copy data is stored is one of a volatile storage area and a nonvolatile storage area; and the copy-operation monitoring portion specifies one of the volatile storage area and the nonvolatile storage area as a designated storage by interpreting the operation pattern via the input device.

3. The information processing apparatus according to claim 2, wherein the display portion selects, in sequence, any of the one or more items of copy data as the paste candidate in an order according to a copy history for each paste operation via the input device and overlays the paste candidate on a window of the paste destination application.

4. The information processing apparatus according to claim 3, wherein the copy-operation monitoring portion increases and decreases the lifetime set for the copy data for each copy operation via the input device.

5. The information processing apparatus according to claim 3, wherein the paste-operation monitoring portion transfers the paste candidate to the paste destination application in response to the confirmation operation and thereafter changes the order of the paste candidate in the copy history.

6. The information processing apparatus according to claim 1, wherein the lifetime is defined as the term of validity in which the copy data is permitted to remain, and a paste limit count at which the copy data is permitted to remain.

7. The information processing apparatus according to claim 1, wherein the copy-operation monitoring portion blocks copying of the copy data indicated by the copy source application to the general-purpose shared memory.

8. The information processing apparatus according to claim 1, further comprising:
an interpretation rule that comprises a plurality of operation patterns that are respectively associated with a given user input and a plurality of actions to be performed that are each associated with a respective one of the plurality of operation patterns.

9. The information processing apparatus according to claim 8, wherein the plurality of actions to be performed comprise at least two of set limit count and copy the data to storage, increase limit count, and change storage type that specifies a type of storage of where the copy data is stored.

10. The information processing apparatus according to claim 1, wherein the lifeline is set to one of a new value for the lifeline or a change to an existing value of the lifetime depending upon the operation pattern.

11. A data duplication method for an information processing apparatus in which one or more applications operate, the method comprising the steps of:
storing, in a storage area by a copy-operation monitor, copy data that a copy source application issues an instruction to copy from a document to a general-purpose shared memory;
setting, for the copy data, a lifetime interpreted from an operation pattern via an input device;
displaying, on a display, a paste candidate selected from one or more items of copy data stored in the storage area in response to a paste operation in a paste destination application;
transferring the paste candidate in the storage area to the paste destination application in response to a confirmation operation via the input device; and
erasing, from the storage area, copy data whose lifetime has expired, wherein the copy-operation monitor determines the lifetime, in cooperation with a content analysis engine that analyzes the content of the obtained copy data, depending on a security level of the copy data that is determined by the content analysis performed by the content analysis engine using a specific keyword or phrase included in the document to determine the security level of the copy data.

12. The data duplication method according to claim 11, wherein the storage area in which the copy data is stored is one of a volatile storage area and a nonvolatile storage area; and the storing step includes a substep of specifying one of the volatile storage area and the nonvolatile storage area as a designated storage by interpreting the operation pattern via the input device.

13. The data duplication method according to claim 11, further comprising:
    determining whether the lifetime has expired by accessing a data structure of control information comprising an identification number for the copy data, a storage type that specifies a type of storage of where the copy data is stored, a term of validity, and a limit count.

14. The data duplication method according to claim 11, wherein the lifetime is set based on an interpretation rule that comprises a plurality of operation patterns that are respectively associated with a given user input and a plurality of actions to be performed that are each associated with a respective one of the plurality of operation patterns.

15. The data duplication method according to claim 14, wherein the lifetime is set to one of a new value for the lifeline or a change to an existing value of the lifetime depending upon the operation pattern.

16. A computer program product comprising a non-transitory computer usable storage medium having stored therein computer-readable program code executable by a computer for implementing an information processing apparatus in which one or more applications operate, the computer-readable program code comprising:
    program code for a copy-operation monitoring portion that acquires copy data that a copy source application issues an instruction to copy from a document to a general-purpose shared memory, sets a lifetime interpreted from an operation pattern via an input device for the copy data, and then stores the copy data in a storage area;
    program code for a display portion that displays, on a display, a paste candidate selected from one or more items of copy data stored in the storage area;
    program code for a paste-operation monitoring portion that transfers the paste candidate read from the storage area to a paste destination application in response to a confirmation operation via the input device; and
    program code for an erasing portion that erases, from the storage area, copy data whose lifetime has expired, wherein the copy-operation monitoring portion determines the lifetime, in cooperation with a content analysis engine that analyzes the content of the obtained copy data, depending on a security level of the copy data that is determined by the content analysis performed by the content analysis engine using a specific keyword or phrase included in the document to determine the security level of the copy data.

* * * * *